Feb. 26, 1924.
J. H. HAMMOND, JR
1,485,183
SYSTEM FOR CONTROLLING MOVING BODIES
Original Filed Aug. 6, 1914  2 Sheets—Sheet 1
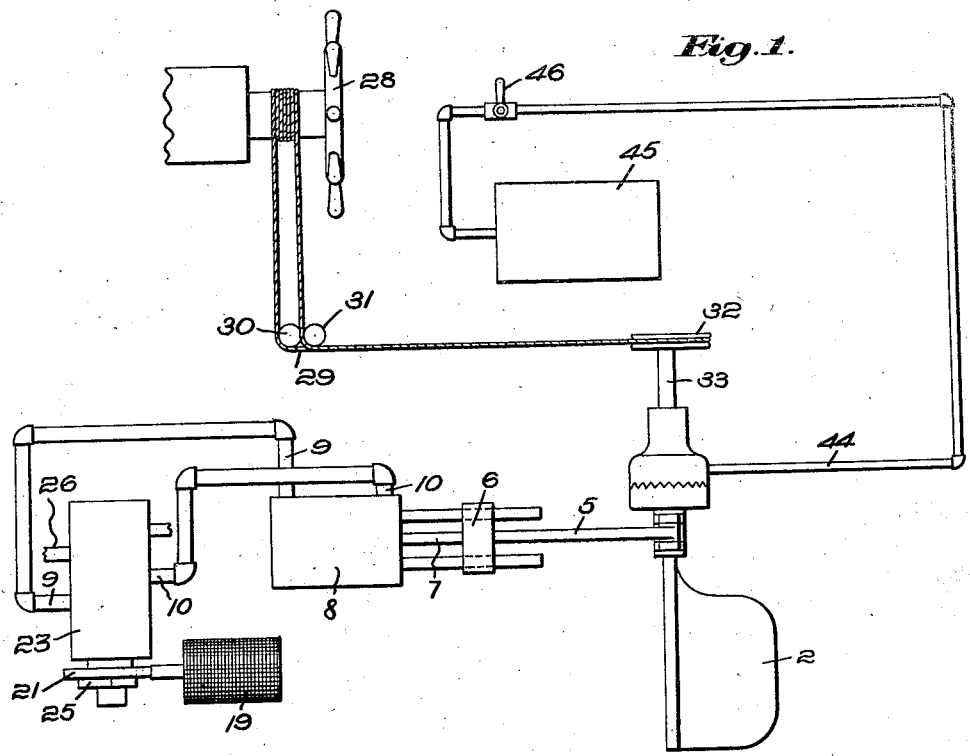
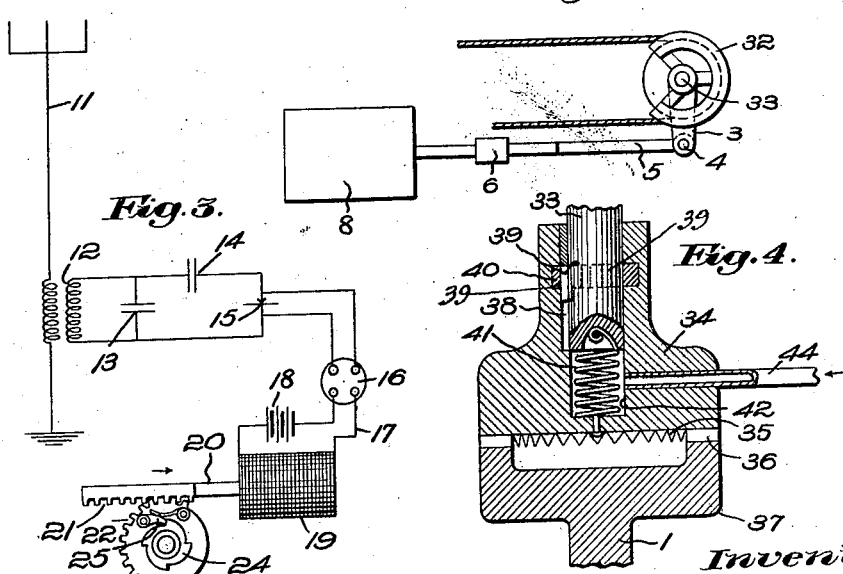

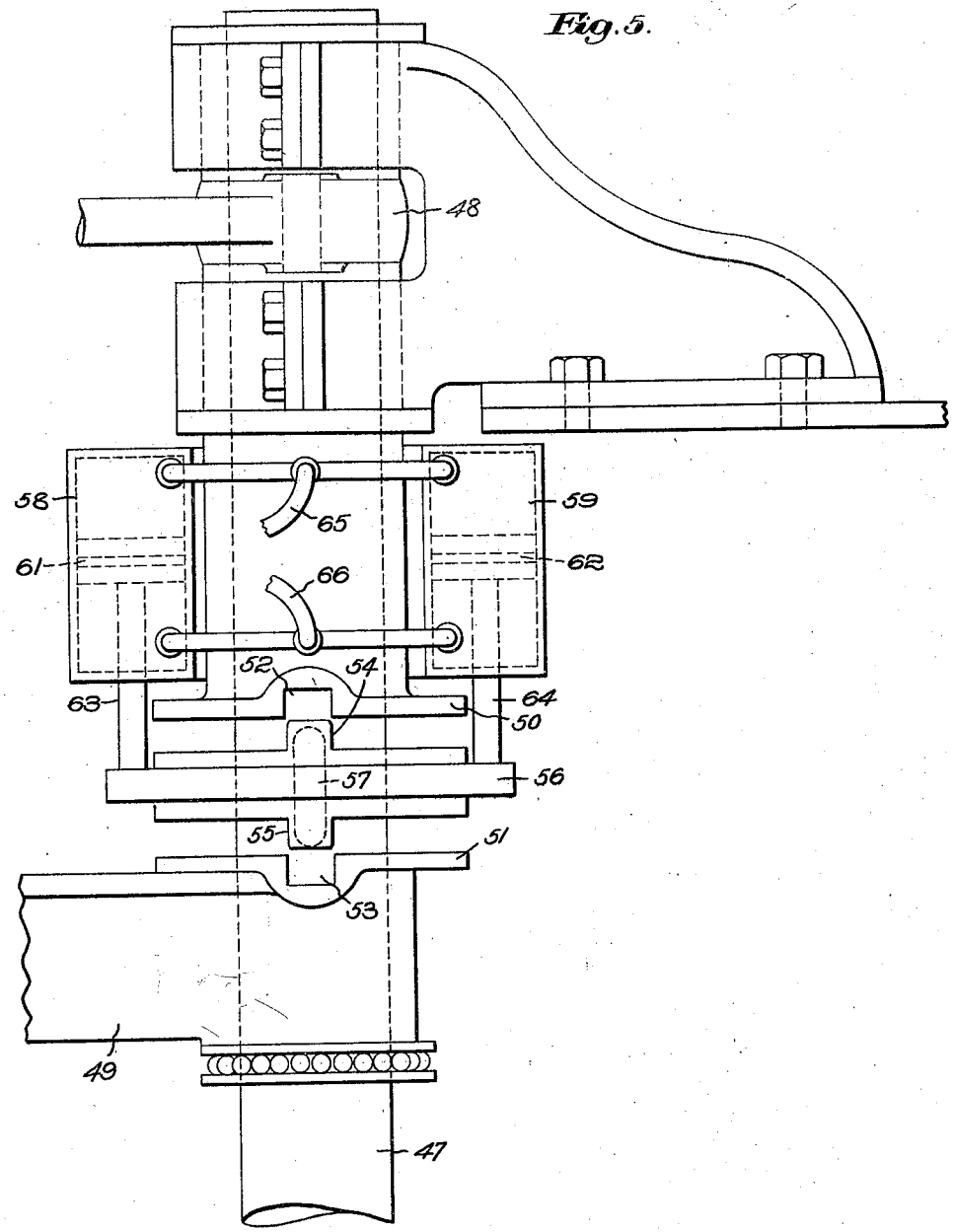

Patented Feb. 26, 1924.

1,485,183

UNITED STATES PATENT OFFICE.

JOHN HAYS HAMMOND, JR., OF GLOUCESTER, MASSACHUSETTS.

SYSTEM FOR CONTROLLING MOVING BODIES.

Application filed August 6, 1914, Serial No. 855,373. Renewed July 24, 1923.

*To all whom it may concern:*

Be it known that I, JOHN HAYS HAMMOND, Jr., a citizen of the United States, and a resident of Gloucester, in the county of Essex and State of Massachusetts, have invented an Improvement in Systems for Controlling Moving Bodies, of which the following description, in connection with the accompanying drawings, is a specification, like characters on the drawings representing like parts.

This invention relates to systems for controlling moving bodies, and more particularly to teledynamic systems in which pneumatic, hydraulic or other fluid pressure or vacuum controlled mechanism for operating the steering gear of moving bodies is controlled by radiant energy transmitted from a distant station.

Within the scope and purpose of the invention, the moving body may be of any suitable type, such, for example, as a vessel, vehicle or aeroplane. I have chosen for illustration the application of my invention to the steering of a torpedo boat or like vessel, inasmuch as my invention is preferably embodied in the control of a vessel.

In the accompanying drawings, wherein certain embodiments of my invention are disclosed,—

Fig. 1 is a view, mainly diagrammatic and partially in side elevation, of a system constructed in accordance with and embodying one type of my invention;

Fig. 2 is a plan view of a portion of the mechanism shown in Fig. 1;

Fig. 3 is a diagrammatic illustration of one type of means responsive to radiant energy for operating the valve means controlling the flow of motive fluid whereby the steering mechanism is governed;

Fig. 4 is a detail in vertical section of one form of means for operatively connecting the manual steering means and the rudder mechanism; and Fig. 5 is a side elevation, on a larger scale, of a form of means for operatively connecting either the fluid pressured controlled means or the manual steering means to the rudder mechanism.

While in its broadest aspect my invention relates to rudder mechanism adapted to be controlled either by an engine or prime mover, such, for example, as a fluid pressure controlled mechanism, or by manual steering mechanism, the invention more particularly relates to the control of moving bodies at a distance by radiant energy and especially to the control of a torpedo boat. In applications heretofore filed by me, I have disclosed various types of mechanisms for effecting the control of the rudder of a vessel through the instrumentality of a prime mover, engine or mechanism responsive to radiant energy transmitted from a distant control station. In accordance with the present invention, I provide means whereby a helmsman upon the vessel may in an emergency or for other reasons instantly relieve the vessel from its control by radiant energy and steer the same manually. Such manual steering means is desirable or essential under certain conditions not herein necessary to set forth in detail.

Referring more particularly to the drawings and first to that form of my invention shown in Figs. 1 to 4 thereof, I have represented at 1 a rudder shaft having fast thereon a rudder 2. At a suitable point thereon, the said shaft is provided with a lever arm 3 which is pivotally connected at 4 to a link 5 suitably connected to the cross head 6. To the cross head is connected a piston rod 7 having thereon a piston mounted in a cylinder 8. The cylinder 8 is provided with suitable means to admit motive fluid to and to exhaust the same from opposite sides of the piston therein, in order to turn the rudder to starboard and to port. It is unnecessary to set forth in detail the means for admitting motive fluid to and exhaust the same from the said cylinder. They may be such as disclosed in my co-pending applications, Serial Nos. 743,270 and 743,271, filed January 21, 1913, and Serial No. 846,468, filed June 22, 1914, or in other applications filed by me.

I have herein indicated the cylinder 8 as provided with passages 9, 10 for admitting motive fluid, such as compressed air to and exhausting it from said cylinder. In the preferred embodiment of my invention, the motive fluid is admitted to and exhausted from the cylinder 8 by means responsive to radiant energy from a distance, and such, for example, as electromagnetic, sound or light waves. Herein for the purpose I have represented in Fig. 3, an open, oscillatory circuit 11, this being connected to the winding 12 of a closed, oscillatory circuit of any suitable type and shown as having therein a condenser 13, a stopping condenser 14 and a suitable detector 15 for electrical oscillations. At 16 I have indicated a sensitive relay or other contact-making device. These parts may be of any suitable construction, not herein necessary more fully to describe or to indicate. At 17, I have indicated a circuit controlled by the relay 16 and having therein a battery 18, and at 19 I have indicated a solenoid, the core or plunger 20 of which is adapted to be moved in the direction of the arrow upon Fig. 3 upon energization of said solenoid. The said core or plunger 20 is provided with teeth 21 with which mesh the teeth of a gear 22 loose upon the spindle of a valve 23. Fast upon said spindle is a ratchet 24 driven by a pawl 25 mounted upon said ratchet, whereby upon energization of the solenoid the valve 23 is rotated in a step-by-step manner, not herein necessary more fully to set forth. The passages 9, 10 operatively connect the rotary valve 23 and the cylinder 8, and said valve is provided with passages 26, 27 for the admission of motive fluid from any suitable source of supply. Any suitable exhaust may be provided.

In the manner described or in any other suitable manner the rudder 2 is controlled by means preferably responsive to radiant energy transmitted from a distant control station.

I have indicated suitable manual steering means at 28, it being connected by a suitable flexible connection 29, passing about guide pulleys 30, 31 and passing about and being suitably connected to the yoke 32 fast upon a shaft 33. As indicated most clearly in Fig. 4, the shaft 33, which is mounted in a suitable fixed bearing 33', is in axial alignment with the rudder shaft 1, and is held by the bearing 33' against longitudinal movement. Loosely mounted upon the steering shaft 33 is a clutch member 34 having teeth 35 at its lower edge adapted to be projected into mesh with teeth 36 upon the head or enlargement 37 of the rudder shaft 1. The steering shaft 33 has fast thereon a key or spline 38 adapted to engage one of a suitable number of keyways or openings 39 in a ring or collar 40 suitably secured to the inner face of the clutch 34.

Normally, that is, when the vessel is under the control of the motive fluid admitted to the cylinder 8, the clutch 34 is held elevated and out of engagement with the teeth of the rudder shaft 1, by means of a suitable coil spring 41 positioned in a chamber 42 and connected at one end to the clutch member 34 and at its other end to the shaft 33. When, however, the clutch 34 is depressed, the key or spline 38 becomes engaged with a suitable keyway or opening in the ring or collar 40, thereby compelling conjoint rotative movement of said clutch 34 and the shaft 33, upon engagement of the teeth 35 of said clutch with the teeth 36 of the rudder shaft 1. In order to move the clutch 34 into operative relation to the rudder shaft 1, I may provide any suitable means, but preferably for that purpose I provide a passage 44 communicating with the chamber 42 wherein the coil spring 41 is mounted and with a suitable reservoir 45 of compressed motive fluid, such as air. At a suitable point and preferably within the reach of the helmsman when stationed at the manual steering means 28, I provide a suitable valve 46.

The construction and relation of parts are such that the helmsman, observing the course of the vessel, may, in the event of emergency, or for any other reason, open the valve 46 and admit motive fluid to the chamber 42, thereby instantly moving the clutch 34 into operative engagement with the rudder shaft 1 and permitting the control of the vessel by said manual steering means 28. The valve 46 is provided with suitable means whereby upon closing the same, motive fluid is permitted to exhaust from the chamber 42, thus permitting the coil spring 41 to lift the teeth of the clutch 34 out of mesh with the teeth 36 of the rudder shaft 1.

It will thus be understood that by opening the valve 46, the vessel is instantly placed under the control of the manual steering means and that upon closing said valve the vessel is relieved from the control of such manual steering means. The provision of suitable means to relieve the vessel of its control by the manual steering means during the periods of its control from the distant control station is of great importance, inasmuch as great frictional losses occur, owing to the connection of the manual steering means with the rudder, and such frictional losses, if permitted to continue during the control of the vessel from the distant control station, would interfere seriously with the proper guidance of the vessel from such distant control station.

In Fig. 5, I have represented another form of my invention. In the construction shown in Figs. 1 to 4 inclusive, the vessel is at all times under the control of the distant control station, the manual steering means being thrown into operation at times determined by the helmsman. This construction compels the helmsman, when operating the manual steering means, to work against the engine, and referring specifically to that form of control represented in my copending application Serial No. 846,468, the helmsman is compelled to operate the manual steering means against the force of the springs in the spring-containing cylinder. In order to overcome this objection, I have, in that form of my invention shown in Fig.

5, provided means whereby the rudder shaft may be placed under the control of either the prime mover or engine or the manual steering means to the exclusion of the other.

In Fig. 5, I have represented the rudder shaft at 47, it having loose thereon a head 48 corresponding to the lever arm 3 of Fig. 2 and suitably connected with the piston 7 of the cylinder 8. Also loose upon said rudder shaft 47 is a steering yoke 49. The adjacent faces 50, 51 of the head 48 and steering yoke 49 are provided with a suitable number of sockets 52, 53 with which are adapted alternately to engage the projections 54, 55 of a suitable clutch 56 splined at 57 upon the rudder shaft 47, so as to be axially movable along said shaft but to rotate therewith.

The clutch 56 may assume any one of three positions. In the position shown in Fig. 5, the rudder shaft 47 is under the control of neither the engine, nor the manual steering means. When the clutch 56 is elevated, so that its teeth or projections 54 enter the sockets 52, the rudder shaft is under the control of the engine, and when the clutch 56 is depressed, so that its teeth or projections 55 enter the sockets 53, the rudder shaft is under the control of the manual steering means.

While any suitable means may be provided to shift the clutch 56, I have herein represented means whereby motive fluid, such as compressed air, may be supplied to the clutch in a manner similar to that represented in Fig. 1. Herein I have represented two cylinders 58, 59 mounted upon a suitable bearing of the rudder shaft 47 or other stationary part. The cylinders 58, 59 are provided with pistons 61, 62 and piston rods 63, 64 connected to the clutch 56. Motive fluid, such as compressed air, may be admitted from the reservoir 45 into the upper ends of the cylinders 58, 59 through passage 65, and may be admitted to the lower ends thereof through passage 66. In connection with the construction shown in Fig. 5, I provide a valve similar to that indicated at 46, but provided with suitable passages whereby compressed air may be admitted as desired to either the passage 65 or the passage 66, and whereby upon its admission to one of said passages it may be suitably exhausted from the other.

From the foregoing description, it will be apparent that I have provided means whereby the vessel may be controlled from the distant control station, but whereby the vessel may be instantly placed under the control of the helmsman stationed thereon, the construction shown in Fig. 5 being such that the vessel may within the will of the helmsman be instantly placed either under his own control or under the control of the operator at the distant control station.

Having thus described one illustrative embodiment of my invention, I desire it to be understood that although specific terms are employed, they are used in a generic and descriptive sense and not for purposes of limitation, the scope of the invention being set forth in the following claims.

Claims:

1. A system for the teledynamic control of moving bodies including in combination, a vessel having a rudder shaft, a rudder fast upon said shaft, means responsive to radiant energy from a distance and connected to said shaft to operate said rudder, a clutch loose upon said shaft, manual steering means, an operative connection between said manual steering means and said clutch, and means to engage said clutch and rudder.

2. A system for the teledynamic control of moving bodies including in combination, a vessel having a rudder shaft, a rudder fast upon said shaft, means responsive to radiant energy from a distance and connected to said shaft to operate said rudder, a clutch loose upon said shaft, manual steering means, an operative connection between said manual steering means and said clutch, and fluid pressure means to engage said clutch and rudder.

3. A system for the control of a movable body, including a rotatable shaft, a rudder arranged to be actuated by said shaft, a plurality of actuating devices arranged to rotate said shaft and a clutch loose upon said shaft and arranged to render any one of said devices operative to control said shaft, and to simultaneously render the remaining of said devices inoperative to control said shaft.

In testimony whereof, I have signed my name to this specification in the presence of two subscribing witnesses.

JOHN HAYS HAMMOND, Jr.

Witnesses:
  JOHN PHILIP KOEHLER,
  JOHN WARREN LEE.